(No Model.)
J. G. ERD.
FLUE HOLE CUTTER.
No. 438,230. Patented Oct. 14, 1890.
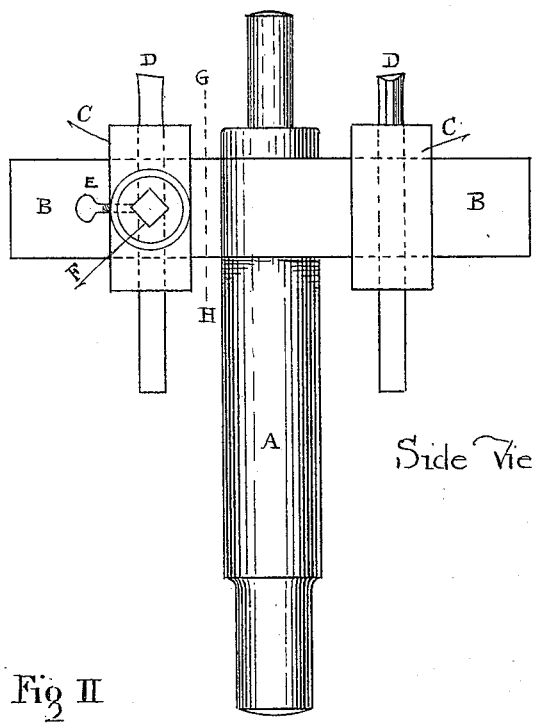
Fig 1
Side View
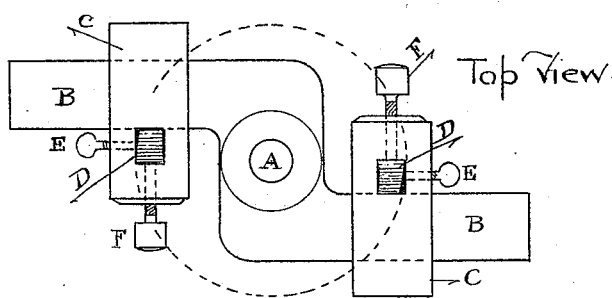
Fig II
Top View
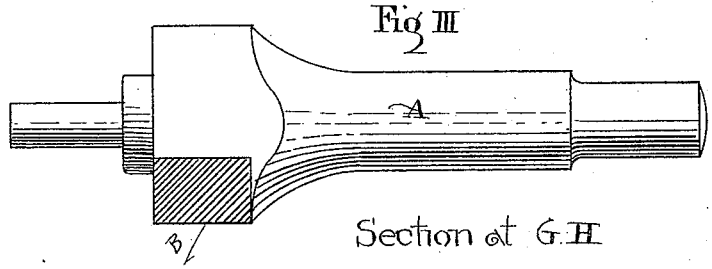
Fig III
Section at G.H.
Witnesses
Inventor
John G Erd
by A.H. Swarthout
Attorney

UNITED STATES PATENT OFFICE.

JOHN G. ERD, OF SAGINAW, MICHIGAN.

FLUE-HOLE CUTTER.

SPECIFICATION forming part of Letters Patent No. 438,230, dated October 14, 1890.

Application filed January 23, 1890. Serial No. 337,896. (No model.)

*To all whom it may concern:*

Be it known that I, JOHN G. ERD, a citizen of the United States, residing at Saginaw, in the county of Saginaw and State of Michigan, have invented certain new and useful Improvements in Flue-Hole Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in flue-hole cutters; and its object is to provide a tool that can be easily adjusted to any size of hole without removing the knives, and also that the knives may be removed for sharpening, &c., and replaced without having to readjust them to the hole. This I accomplish by the following-described mechanism.

Figure I is a side view of the cutter inverted. Fig. II is a top view of the cutter. Fig. III is a sectional view of the shank, showing depth of shoulder at line G H in Fig. I.

A is the shank, having its upper end fitted to insert into the socket of the drill and the lower end fitted to pass through hole in the boiler-head plate to hold the plate in place, as in ordinary cutters.

B are arms of the shank A, extending in opposite directions horizontally and at right angles to the shank A and parallel to an extended diameter-line of the shank A and at such a distance therefrom that when the knives D are inserted between said line and the arms B the cutting-edge of each will be on the said diameter-line.

C are dogs sliding over the arms B, to which they may be rigidly secured by means of the set-screw F.

D are knives or cutting-tool proper and pass through slots in the dogs C provided for them at the edge of the arms B, and with their cutting-edge on the outside and on a line with each other, which line should be the diameter-line of the shank A. The knives D are held in the dogs C by the thumb-screw E and are firmly secured to the arms B with the dogs C by the set-screw F.

To adjust the knives for a larger or smaller hole, the set-screw F is loosened and the dogs C slid along the arms B to the desired point and again tightened.

I do not wish to be understood as confining myself to any special form or construction of parts, and therefore any change may be made as comes within ordinary mechanical skill without departing from the principle of my invention.

Having thus fully described my invention, what I claim as new, and desire to secure by Letters Patent, is—

1. A flue-hole cutter having its shank A fitted at its upper end for engaging a drill-socket and at its lower end for passing through and holding the plate to be drilled in position, and having two horizontal arms B at right angles to the shank A and extending from opposite sides in opposite directions and at equal distance from and parallel to an extended diameter-line of shank A, and having dogs C sliding over arms B, said dogs C having slots through which knives D pass just at the side of the arms B, the cutting-edge of knives D being on line with each other and the center of shank A and being concentric with shank A and each other and secured to dogs C by thumb-screw E and with dogs C to arms B by set-screw F, substantially as and for the purpose set forth.

2. In a flue-hole cutter, the shank A, having two horizontal opposite arms B at right angles to shank A and extending parallel to a line drawn through the diameter of shank A, in combination with the dogs C, sliding upon arms B, and knives D, passing through slots in dogs C at side of arms B and between arms B, and an extended diameter-line of shank A, with their cutting-edge toward and upon said line, and set-screw F, holding knives and dogs in position on arms B, substantially as and for the purpose set forth.

3. In a flue-hole cutter, the shank A, having two horizontal opposite arms B at right angles to shank A and extending parallel to a line drawn through the diameter of shank A, in combination with the dogs C, sliding upon arms B, and knives D, passing through slots in dogs C at side of arms B and between arms B, and an extended diameter-line of said shank A, with their cutting-edge toward and upon said line, and the thumb-screw E, holding knives D firmly in dogs C, and set-screw F, securing dogs C to arms B, substantially as and for the purpose set forth.

In testimony whereof I affix my signature in presence of two witnesses.

JOHN G. ERD.

Witnesses:
W. L. CASE,
A. H. SWARTHOUT.